US008740492B2

(12) United States Patent
Andreasen

(10) Patent No.: US 8,740,492 B2
(45) Date of Patent: Jun. 3, 2014

(54) COUPLING FOR A HOISTING SYSTEM

(75) Inventor: Jesper Thaagaard Andreasen, Sabro (DK)

(73) Assignee: V. Guldmann A/S, Aarhus N (DK)

( * ) Notice: Subject to any disclaimer, the term of this patent is extended or adjusted under 35 U.S.C. 154(b) by 566 days.

(21) Appl. No.: 13/001,322

(22) PCT Filed: Jun. 23, 2009

(86) PCT No.: PCT/DK2009/050140
§ 371 (c)(1),
(2), (4) Date: Dec. 23, 2010

(87) PCT Pub. No.: WO2009/155930
PCT Pub. Date: Dec. 30, 2009

(65) Prior Publication Data

US 2011/0110715 A1 May 12, 2011

(30) Foreign Application Priority Data

Jun. 27, 2008 (DK) .......................... PA 2008 00895

(51) Int. Cl.
*F16D 1/00* (2006.01)

(52) U.S. Cl.
USPC .......................................................... 403/353

(58) Field of Classification Search
USPC ................ 403/353, 355, 321, 324, 325, 326; 294/82.11, 215, 81.56
See application file for complete search history.

(56) References Cited

U.S. PATENT DOCUMENTS 3,186,055 A 6/1965 Modrey
4,056,250 A * 11/1977 Uchiyama .................... 248/674
4,105,347 A * 8/1978 Gossage ....................... 403/157
6,375,380 B1 4/2002 Snyder et al.
6,523,195 B1 2/2003 Rodier et al.
7,237,491 B2 7/2007 Faucher et al.

FOREIGN PATENT DOCUMENTS

AU 2007100710 A4 10/2007
DE 297 10 055 U1 12/1997
DK 2006 00059 U3 7/2006

OTHER PUBLICATIONS

International Search Report for International Application No. PCT/DK2009/050140, Dated Sep. 16, 2009.

* cited by examiner

*Primary Examiner* — Michael P Ferguson
*Assistant Examiner* — Daniel Wiley
(74) *Attorney, Agent, or Firm* — Roberts Mlotkowski Safran & Cole, P.C.; David S. Safran

(57) ABSTRACT

A coupling that includes a housing with a cutout; a cylindric shaft extending transversely to the cutout through aligned openings; a hook having a width which is less than the width of the cutout and which has a receiving opening with a diameter corresponding to the shaft diameter that is received in the opening. An insertion opening is provided that has a width which is less than the shaft diameter and which is oriented at an angle relative to a direction of pull by loading the hook. A part of the shaft that is disposed in the cutout is provided with opposing flats with a mutual spacing which is less than the width of the insertion opening. The shaft is arranged for longitudinal manual displacement against the action of a spring, from a first position where the flats are located outside the cutout to a second position where the flats are in the cutout.

8 Claims, 17 Drawing Sheets

COUPLING FOR A HOISTING SYSTEM

BACKGROUND OF THE INVENTION

1. Field of the Invention

The present invention concerns a coupling, including:

a housing with a cutout at the first end;

a cylindric shaft extending transversely to the cutout through aligned openings at each side of the cutout;

a hook having a width which is less than the width of the cutout and which has a receiving opening with a diameter corresponding to the shaft diameter, and which is intended for receiving the shaft and an insertion opening having a width which is less than the shaft diameter and which is oriented at an angle relative to a direction of pull by loading the hook, where the shaft at a part for disposition in the cutout is provided with opposing flats with a width at least corresponding to the width of the hook and with mutual spacing which is less than the width of the insertion opening.

Furthermore, the invention concerns the use of such a coupling.

2. Description of Related Art

Hoisting systems for internally moving persons is an important part of the equipment in, e.g., a hospital or a nursing home. These enable moving entirely or partially immobile patients or inhabitants between their bed, toilet, bath or other place of stay, without the care assistants having to do heavy lifting.

Hoisting systems of this type often consist of an overhead rail system with a trolley that enables horizontal displacement, and a hoisting system suspended from the trolley that enables vertical displacement. An apron is put on the person, and the apron is connected to the hoisting system, typically via lifting bracket.

The hoisting system is provided with one or more motors for performing the vertical movement. Moreover, the trolley can be connected with one or more motors performing the horizontal movement. Alternatively, horizontal movement can be effected manually by a care assistant pushing the hoisting system or the person to be moved.

The hoist system may alternatively, instead of being ceiling-mounted, be mounted on a mobile unit with wheels under it. The patient may hereby be moved independently of a fixed overhead rail system.

Operation of the various functions is performed by the care assistant or the person himself via a control on the hoisting system or a handheld control unit.

Examples of such hoisting systems are known from U.S. Pat. No. 7,237,491 B2 or U.S. Pat. No. 6,523,195 B1.

By all these systems it is important that the strap is fastened to the lifting bracket in a safe way such that one avoids loosing the person to be lifted. This is effected by a coupling which is disposed between the strap and the lifting bracket.

It is a requirement that the coupling contains means that prevent the lifting bracket from being released when the hoist system is in use and loaded. The means are to be fail-safe such that they preclude deliberate as well as inadvertent release when the hoist system is loaded.

There exist prior art couplings where the hook grips around a shaft, where the shaft is provided with flats that may pass the insertion opening of the hook when the insertion opening has a correct angle relative to the shaft. This angle is different from the angle of a hook in relation to a shaft in use. When the hook is turned to the angle during use, it is no longer possible for the flats to pass the insertion opening. This makes it difficult to release the hook when it is loaded. The drawback of the prior art system is that there is a risk that the hook is released when the system has been completely unloaded and then lifting is performed afterwards. In this situation, the hook may come partly out of engagement with the shaft if the hook during unloading is turned to an angle where the flats may pass the insertion opening.

SUMMARY OF THE INVENTION

It is the object of the invention in a simple and uncomplicated way to indicate a coupling for a hoist system which ensures that the coupling may only be released when not loaded. The coupling is to be used in a hoist system for persons.

According to the present invention, this is achieved by a coupling of the type mentioned in the introduction which is peculiar in that the shaft is arranged for manual displacement in its longitudinal direction against the action of a spring, from a first position where the flats are located outside the cutout, and to a second position where the flats of the shaft are displaced into the cutout.

This is furthermore achieved by using a combination of a coupling together with a lifting bracket, preferably in a hoist system with a lifting strap and a lifting apron.

Additional safety against release of the coupling is hereby achieved. In addition to having to turn the hook relative to the shaft in order to release the hook, one also has to displace the shaft to a position where the flats are located in the cutout. The spring-biased shaft has a rest position where the flats are located outside the cutout. Thus two active actions are required for releasing the coupling.

Therefore, the coupling is provided double safety such that one cannot release it when the coupling is loaded as angular motion is largely impossible when the hook is loaded, since one is to lift all of the suspended weight manually; even if that was possible, one is limited to only lift that which is possible with one hand as the other hand has to be free for displacing the shaft. It is not possible either to release the hook inadvertently when it is not loaded as a deliberate action has to be performed in order to release the hook.

Hereby is indicated a coupling for a hoist system which has a very good safety, as it only can be released when not loaded. Inadvertent release is prevented both when the coupling is loaded and when it is unloaded.

At the same time, the coupling is rapidly released since no split-pins or other safeguards are to be removed.

The coupling will typically be used in hoist systems for persons where it is provided in connection with a lifting bracket from which a person is suspended in a lifting apron supporting the person.

According to a further embodiment, the coupling according to the invention is peculiar in that the spring is directly or indirectly connected with the shaft and the housing.

Hereby is achieved that spring action is established in a simple way since springs is a known and old technology. The spring may either be immediate contact with the shaft or the housing, or it may be indirectly connected through other elements which subsequently are connected with the shaft or the housing. The spring will typically be a compression spring in contact with the housing, and which is connected to a pushbutton connected with the shaft.

According to a further embodiment, the coupling according to the invention is peculiar in that the spring is chosen among compression springs, extension springs, twist springs or torsional springs.

The choice of spring depends on how much space exists around the housing and how the connection of the spring between housing and shaft can be established.

According to a further embodiment, the coupling according to the invention is peculiar in that the angle of the insertion opening in relation to the pull direction by loading the hook is preferably 90°.

The safety against release under load depends on the angle of the insertion opening. The greater angle relative to the pull direction by load on the hook, the better safety against release. Simultaneously with increasing the angle, the time to be used for releasing the hook increases. It has appeared that an angle of 90° is an optimal compromise.

According to a further embodiment, the coupling according to the invention is peculiar in that the housing further includes a contact surface facing perpendicularly to the pull direction for an thrust bearing at the other end of the housing.

This contact surface makes it possible to provide the housing with an thrust bearing upon which a lifting bracket can bear. The lifting bracket is provided with an apron in which e.g., a person is carried. Hereby is achieved good transmission of forces from the lifted object through the lifting bracket and the thrust bearing to the housing, the shaft and the hook, which is typically fastened to a lifting strap which is rolled on or off a reel provided in the hoist system, which is typically fastened to a rail in the ceiling, simultaneously with the lifted object is able to be turned around to a desired position. This may, e.g., be when a person is to be lifted from a bed to a wheelchair.

The disposition of the contact surface is not limited to the other end of the housing. It may be disposed at an arbitrary position under the shaft, but with regard to the built-in height it is preferred that it is disposed at the other end of the housing.

According to a further embodiment, the coupling according to the invention is peculiar in that the hook has an opening for receiving a lifting strap.

Hereby it becomes possible to fasten the hook to a lifting strap which is rolled up on a reel in the hoist system. A load connected to the coupling may then be lifted and lowered by means of the hoist system.

The opening can be circular, oval or polygonal, or a combination of the said shapes. This depends on the design of the lifting strap. Typically, the lifting strap will be a flat band. The opening will therefore be flat and elongated with rounded corners and edges such that the lifting strap is not worn unnecessarily.

According to a further embodiment, the coupling according to the invention is peculiar in that the housing further includes a cover with an opening which is aligned with the opening of the housing, and that the shaft is received in the cover, both in its first and its second position.

Hereby is achieved that the shaft is better protected against inadvertent operation, since the shaft now may only be moved by the pressing in through the opening in the cover.

According to a further embodiment, the coupling according to the invention is peculiar in that a shaft end is provided with a pushbutton, preferably with an ergonomically designed, oval shape for activation by a thumb.

Good and safe operation of the shaft is hereby achieved. The pushbutton may have a plurality of designs, but will typically be adapted to an average thumb.

The cover may advantageously be provided with a guide for the button so that the user cannot get his finger caught between the inner side of the cover and the pushbutton when the latter is operated.

The invention may advantageously be combined with one or more of the following two independent inventions, as well as the following two inventions can be combined with each other.

Invention 1

A rail system for an overhead hoist system suspended from the rail system, and wherein the rail system includes a primary rail which is a four-edged profile with hollow cross-section and a longitudinal slot at the bottom, at which the slot and the hollow cross-section are adapted for receiving and supporting part of the suspended hoist system, where the rail system includes at least one angular secondary rail which on its one leg has connecting means that interact with connecting means on the side of the primary rail, and which on its other leg has a support surface for support an adjacent ceiling board.

In the present application, by primary rail is meant the supporting rail of the hoist system, and by secondary rail is meant a rail between support rail and ceiling boards.

When mounting a secondary rail at each side of the primary rail, the support surface of the secondary rail forms a support for the ceiling boards. The ceiling boards may then be set up by being supported by known wood strips and the support surface on the secondary rail. The ceiling and the rail system will then appears as integrated building parts. The secondary rail will cover the gap between the ceiling boards and the rail so that the ceiling appear as a surface which is only broken by the slot in the rail.

It is avoided closing the gap by applying filler. The use of filler is not expedient since the joint has to be broken each time the rail or the installation above the ceiling boards is to be serviced, after which the area has to be cleaned from old filler and a new joint is established.

According to a further embodiment, the rail system according to the invention is peculiar in that the connecting means on the primary rail and the secondary rail are at least one longitudinal undercut groove and at least one interacting longitudinal first projection.

The primary rail and the secondary rail will typically be profiles that are made in an extrusion process. This production method is suited for making longitudinal form connections. The connecting means in the primary rail and the secondary rail are interacting and complementary. If the primary rail is provided with a longitudinal groove, the secondary rail will be provided with complementing projections and vice versa.

That the groove is undercut ensures that the secondary rail is retained to the primary rail, and that the secondary rail can transmit forces to the primary rail when the contact face of the secondary rail is loaded by the weight of a ceiling board.

The secondary rail is to be inserted from the end of the primary rail.

According to a further embodiment, the rail system according to the invention is peculiar in that the connecting means are formed in the secondary rail as a C-shaped projection and in the primary rail as a circular groove.

Hereby it becomes possible to insert the secondary rail from the side of the primary rail. This may be advantageous if removing the secondary rail from an already mounted long primary rail. Dismounting the primary rail for removing the secondary rail is hereby avoided.

Typically the C in the projection will be turned a number of degrees relative to vertical. This enables insertion of the secondary rail from the side of the primary rail by turning the secondary rail while the free end of the C is inserted first. The secondary rail is then gradually righted while the rest of the C-shaped projection is inserted.

According to a further embodiment, the rail system according to the invention is peculiar in that the secondary rail has a first mounting position with its underside largely in the same plane as the underside of the primary rail, and a second mounting position with the underside in a plane which is above the underside of the primary rail.

Hereby is achieved that the rail system also can be used in connection with crossbar hoist systems. A crossbar hoist system consists of two overhead parallel support rails. A third rail, a so-called crossbar, is suspended in the two parallel support rails such that the crossbar can be displaced along the support rails. The hoist system is suspended in the crossbar.

In such a system it may be necessary with a free space for the installations of the crossbar which may extend in the interspace between the two support rails to a position above the underside of the support rails. This implies that the underside of the support rails is to be spaced apart from the underside of the ceiling.

Ceiling and rail hereby appear without any gap and the board still have the possibility of being supported on the secondary rail. This solution can also be used in common hoist systems without crossbar if it is not possible for the underside of the support rail to be flush with the underside of the ceiling.

According to a further embodiment, the rail system according to the invention is peculiar in that the support surface of the secondary rail is arranged on a first side of the second leg of the secondary rail in the first mounting position, and that the support surface of the secondary rail is arranged on the opposite side of the second leg of the secondary rail in the second mounting position.

Hereby is achieved that the secondary rail can be moved between the two mounting positions by reversing it and inserting it in the same mounting groove, or rotating it 180° about the longitudinal axis and insert it in the mounting groove at the opposite side of the primary rail. Moreover, it is hereby nor required with different secondary rails for the two mounting positions.

According to an alternative embodiment, the rail system is peculiar in that the primary rail is provided with a first set of connecting means for the first mounting position and a second set of connecting means for the second mounting position, and that the support surface of the secondary rail is arranged on the same side of the second leg of the secondary rail for both mounting positions.

Hereby is achieved that the secondary rail can be moved between the two mounting positions by inserting it in respective connecting means. Thus it is not required to make changes on the primary rail or the secondary rail when the secondary rail is to be moved. It is expedient to adapt the spacing between the connecting means to the required free height for crossbar systems.

According to a further embodiment, the rail system according to the invention is peculiar in that the secondary rail at a position under the first projection is provided with a further projection resting on a support surface at the side of the primary rail.

Hereby, a better distribution of the forces in the rail is achieved. The first projection of the secondary rail is loaded by tension which is easier to resist than bending, to which it is exposed without the further projection. The additional projection is loaded by compression.

If the secondary rail is adapted such that it can be disposed in two mounting positions by turning it end on end or rotating it, it must necessarily be designed with two further projections disposed symmetrically around the first projection such that there always is at least one further projection at a position under the first projection, irrespectively in which of the two mounting positions the secondary rail is disposed.

According to a further embodiment, the rail system according to the invention is peculiar in that the primary rail is provided an upwardly facing contact surface, and that the first projection of the secondary rail is provided a downwardly facing contact surface for supporting on the support surface of the primary rail.

Hereby, a further improvement of the distribution of the forces in the rail is achieved. The greater part of the vertical forces stemming from the weight of the ceiling board will be transmitted from the secondary rail to the primary rail through the upwardly facing support surface of the primary rail.

According to a further embodiment, the rail system according to the invention is peculiar in that the primary rail is an extruded profile optionally made from aluminum or steel.

The extrusion process is a relatively cheap production method compared with the possibilities provided for making shapes that are particularly optimised for a given purpose. It will thus not be possible to make a profile having grooves and projections of even lesser complexity at the same cost by other methods than extrusion. Another aspect of the production method is the small tolerances at which it is possible to make the profile. This means that a very even movement of the hoist system along the profile is obtained. The typical choice of material is aluminum. Steel can be chosen where there is need for great strength or other characteristics not found in aluminum.

According to a further embodiment, the rail system according to the invention is peculiar in that the secondary rail is an extruded profile optionally made from aluminum or plastic.

Like the primary rail, the secondary rail is particularly suited to be made by extrusion for the reasons mentioned previously. Aluminum is a very advantageous material as the raw materials are cheap, it is easy to process and has the required strength. Preferably, Aluminum 6060 is used. Alternatively, plastic can be used which is also cheap and easy to make by the extrusion process. Preferably, a thermoplastic material is used. The plastic material can be chosen such that it may be dyed. This is an advantage as the color of the secondary rail may be adapted in relation to other building parts.

According to a further embodiment, the rail system according to the invention is peculiar in that the primary rail is provided a longitudinal undercut recess on at least one side for receiving a longitudinal decoration board at the side of the primary rail.

Hereby is achieved that the primary rail can be covered by a decoration board hiding mounting grooves at the side of the primary rail, and providing the primary rail with a uniform surface when the rail is mounted suspended from the ceiling. The decoration board can be provided with a uniform colour that fits the rest of the interior in the building. Alternatively, the decoration board can be decorated with different figures. This is particularly relevant on children's wards in hospitals. The decoration board is inserted from the end of the primary rail and can easily be changed to other motives.

The same primary rail may then be adapted to different users or interiors, just by substituting the decoration board with a new design.

Invention 2

A manual control for use in a hoist system, wherein the manual control is peculiar in that a grip is formed by a first part projecting from the housing of the manual control, the first part having a largely T-shaped cross-section with grip surfaces that extend transversely to the stem of the T and intended for disposition between two fingers when a user uses the grip.

Furthermore, it is achieved by a method of the type specified in the introduction which is peculiar in that the housing and the grip are provided by a multi-component moulding, preferably a 2K moulding.

The manual control is held by the care assistant gripping around it with a primate grip. By this action, the grip is placed with the T-shaped cross-section between two fingers, primarily the long finger and the ring finger. The thumb will typically be the finger used for pressing the control buttons of the manual control.

When the care assistant opens her hand, the manual control will remain in the hand because the grip between the fingers prevents it from sliding out of the hand. Even if the care assistant holds the open palm of the hand downwards, the manual control will remain hanging, supported by the branches of the T.

Thus, it becomes possible to perform adjustments on person and apron during lifting while at the same time the manual control remaining in the hand of the care assistant. The manual control may quickly be released when the care assistant so desires by opening the primate grip and spreading the fingers.

According to a further embodiment, the manual control according to the invention is peculiar in that the transition between the stem and the branches of the T is rounded.

By a multi-component moulding or casting it is possible to mould two incompatible materials into one and the same moulded casting. Hereby, the housing and grip of the manual control appear as one and the same unit without joints, even though the housing and the grip are made of different materials. The joint between the housing and the grip attains very great strength thereby. Moreover, this also contributes to increase the cleaning-friendliness as no contaminations can penetrate in between the grip and the housing.

According to a further embodiment, the manual control according to the invention is peculiar in that the transition between at least two elements selected among the stem of the T, the branches of the T and the housing of the manual control are rounded.

Hereby is achieved better ergonomics for the user as the shape of the rounding is adapted such that it approximately corresponds to the shape of a finger.

According to a further embodiment, the manual control according to the invention is peculiar in that the grip includes at least one further projecting part which has a largely L-shaped cross-section with a support surface facing the first projecting part.

Hereby is achieved an improvement of the ability of the manual control to remain in the hand when the care assistant opens the hand. The additional L-shaped projecting part will typically be disposed at the side of the index finger or the little finger with the branch of the L facing the first projecting part. The branch of the L hereby acts as a hook.

According to a further embodiment, the manual control according to the invention is peculiar in that the transition between at least two elements selected among the stem of the L, the branch of the L and the housing of the manual control is rounded.

Hereby is achieved better ergonomics for the user as the shape of the rounding is adapted such that it approximately corresponds to the shape of a finger.

A particularly advantageous embodiment of the manual control is provided with a first T-shaped grip for placing between long finger and ring finger. The T-shaped grip has a rounding at each side in the shape of an unbroken partial circle between the stem of the T, the branches of the T and the housing of the manual control. Two additional L-shaped grips are disposed at the side of index finger and little finger, respectively, with the branches facing inwards against the first grip. The L-shaped grip has a rounding facing in towards the first grip in the shape of an unbroken partial circle between the stem of the L, the branches of the L and the housing of the manual control. Hereby is obtained a gap with an approximately oval cross-section and a side opening at each side of the first projection.

Hereby is achieved good safety against the manual control sliding out of the hand of the care assistant when the care assistant opens the hand, because four of the fingers of the hand are in contact with grips. In addition, part of the hoist system for person, e.g., the lifting bracket, may be adapted as parking for the manual control when this is not in use, in that that the parking part is provided a cross-section corresponding to the gap. The manual control is passed in over the parking part through the side opening in the approximately oval cross-section.

According to a further embodiment, the manual control according to the invention is peculiar in that the cross-section of the housing is optionally circular, oval, polygonal or a combination of these, preferably rectangular with rounded edges.

The shape and thereby the cross-section of the housing depend on many factors, such as the mean size of the care assistants' hands, the number and position of control buttons, whether the manual control is provided with display, ergonomics and aesthetics.

It has appeared that a rectangular cross-section where top side and bottom side are connected by a circle is a particularly suited embodiment.

According to a further embodiment, the manual control according to the invention is peculiar in that the housing is 50-250 mm long, 20-60 mm wide and 5-20 mm high, preferably 187 mm long, 36 mm wide and 18 mm high.

Typically, the manual control will thus have a shape where it is elongated, narrow and flat. This provides good ergonomics and possibility of positioning pushbuttons suitably in relation to the finger or fingers operating it. Typically, the control buttons will be operated by the thumb.

In addition, the design provides space so that the manual control can be provided with a display. Such a display may give information about, e.g., weight, battery condition, risk of overload, etc.

According to a further embodiment, the manual control according to the invention is peculiar in that the grip is provided from a thermoplastic polymer with a Shore A between 60 and 80, preferably 70.

By choosing a thermoplastic polymer there is provided a material for the grip which is easy to process by e.g., injection moulding, while simultaneously being yielding and having a relatively great coefficient of friction, as the material has both thermoplastic and elastomeric properties. The thermoplastic elastomer may e.g., be selected among TPE-O (olefinic), TPE-S (styrenic) or TPU (urethane).

According to a further embodiment, the manual control according to the invention is peculiar in that the housing is made of a plastic material, preferably acrylonitrile styrene acrylate (ASA), ASA mixed with polycarbonate (ASA/PC), acrylonitrile butadiene styrene ABS, ABS mixed with polycarbonate (ABS/PC).

The choice of material depends on the chosen production methods and the desired properties of the material, such as durability and strength. The above materials are the most suited materials.

According to a further embodiment, the manual control according to the invention is peculiar in that it is provided with a plane of symmetry through the housing and the grip for operation by the left or the right hand.

Hereby is achieved that the manual control can be used both with the left and the right hand, respectively, which is practical with regard to the user's preference of hand used primarily, but also for providing more flexibility in the connection with using the system when space is limited.

The invention will be explained in more detail below with reference to the accompanying drawing, where:

DETAILED DESCRIPTION OF THE INVENTION

Figure 1:
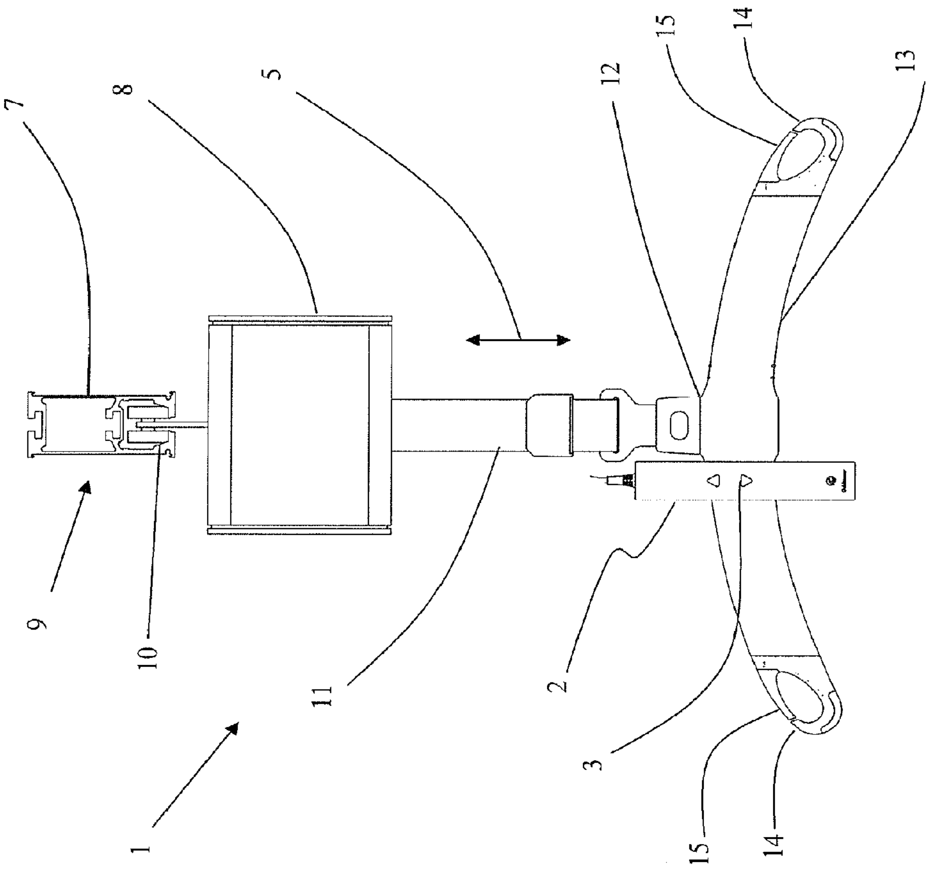
FIG. 1 shows a side view of a hoist system.

In the explanation of the Figures, identical or corresponding elements will be provided with the same designations in different Figures. Therefore, no explanation of all details will be given in connection with each single Figure/embodiment.

FIGS. 1-6 show a hoist system 1 in various embodiments. The hoist system includes an overhead rail system 9 which includes a primary rail 7 carrying a trolley 10 which is connected to a hoisting unit 8. The trolley 10 has wheels inside the primary rail 7 and is connected to the hoisting unit 8 such that the hoisting unit 8 can be displaced in directions along the primary rail 7 as indicated by the arrow 6. The hoist unit 8 has a lifting strap 11 connected to a coupling 12 on a lifting bracket 13. The hoisting unit 8 is internally fitted with a hoist motor which can roll the lifting strap 11 in and out such that the lifting bracket 13 can be displaced up and down as indicated by the arrow 5.

The lifting bracket is provided with a hook 14 at each end for fastening a lifting apron (not shown) which supports a person (not shown) to be lifted and moved. The hook 14 is provided with a lock 15 such that the straps 16 (see, FIG. 17) will not inadvertently loose their engagement with the hook 14. The lock 15 is made of a resilient material that bends down when the straps 16 are hooked on the hook 14, returning to the original shape so as to lock, and bends up when the straps 16 are unhooked from the hook 14.

The different functions of the hoist system are operated by a manual control 2 communicating with a control unit inside the hoist unit 8. The manual control 2 is provided with control buttons 3 so that a user can operate the different functions. The manual control 2 may also be provided with a display 4. On this display 4, various information can be presented to the user, e.g., the weight of the person, remaining battery capacity of the manual control 2 and the possible battery capacity of the hoist system. The weight is measured by means of as device inside the hoist unit 8. This device may, e.g., be based on a strain gauge.

The hoist system may be connected to a public electricity supply, a local electricity supply or a battery.

Figure 2:
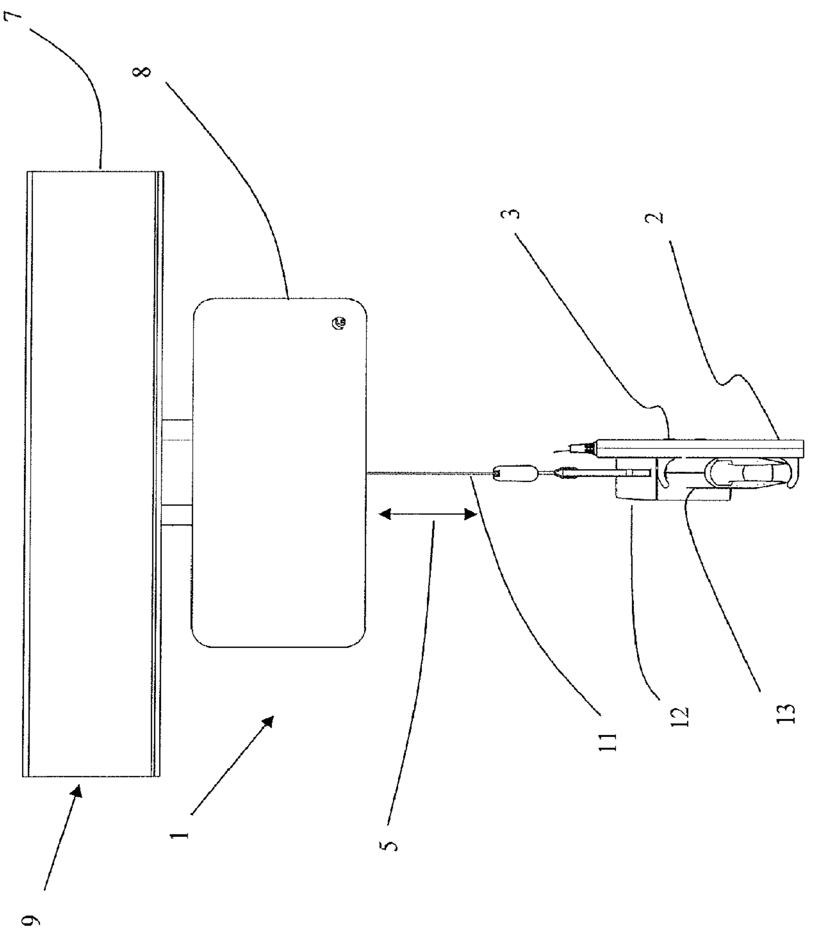
FIG. 2 shows a second side view of a hoist system.

The embodiment in FIGS. 1-2 is a basic model where the manual control 2 is a simple model with two control buttons 3 controlling the hoist motor of the hoist system for moving upwards and downwards. Displacement 6 along the primary rail 7 is effected manually.

Figure 3:
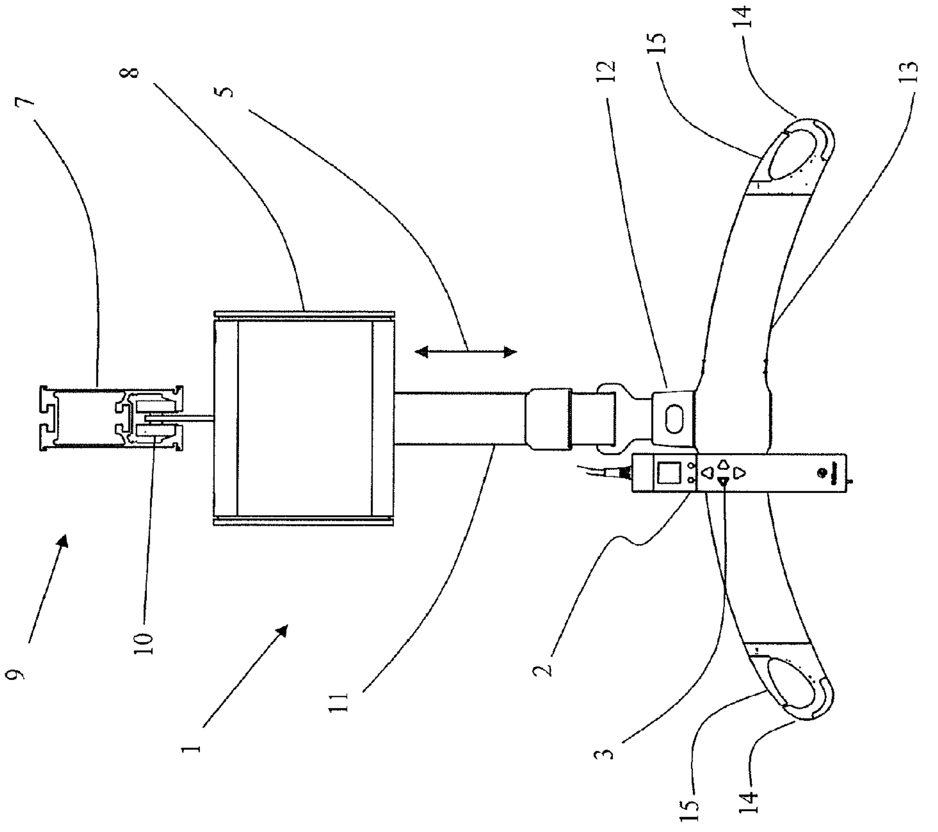
FIG. 3 shows a side view of a second hoist system.
Figure 4:
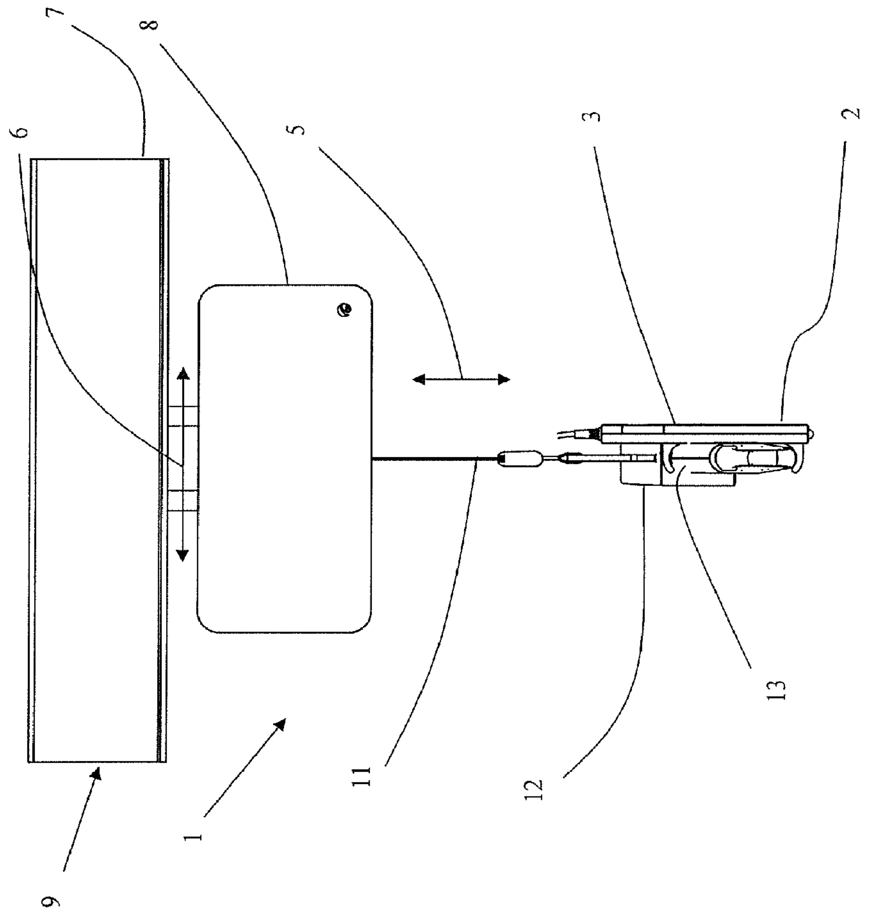
FIG. 4 shows a second side view of a second hoist system.

The embodiment in FIGS. 3-4 is a more advanced model where the manual control 2 has several functions. The manual control 2 has four control buttons 3 which, besides controlling the hoist motor of the hoist system for movements in upward and downward direction 5, also controls a motor for the movement 6 of the hoist system along the primary rail 7. Moreover, the manual control 2 has a display 4.

Figure 5:
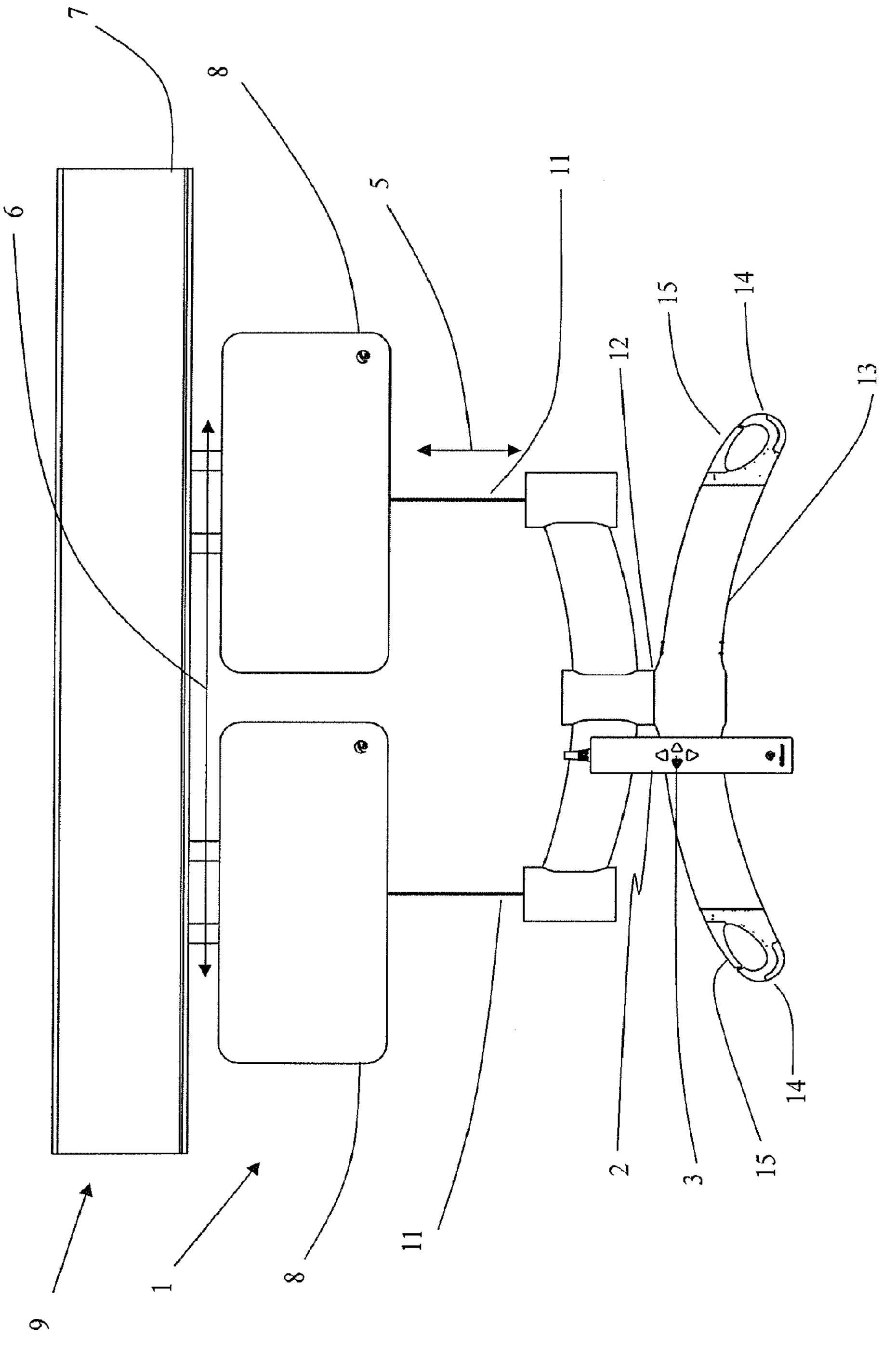
FIG. 5 shows a side view of a third hoist system.
Figure 6:
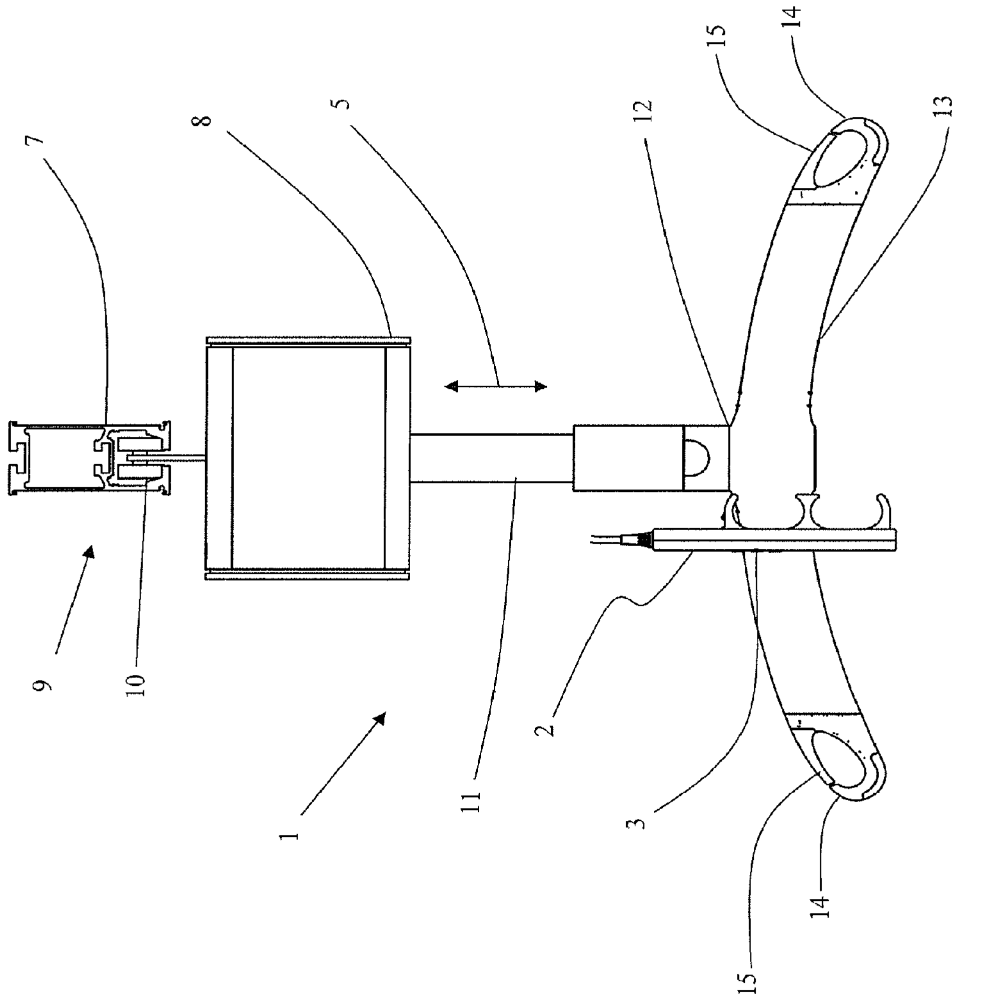
FIG. 6 shows a second side view of a third hoist system.

The embodiment in FIGS. 5-6 is a model with extra lifting power. The hoist system 1 includes two identical hoisting units 8 that double the lifting capacity of the hoist system. The manual control 2 has the same functions and properties as the model in FIGS. 3-4.

Figure 7:
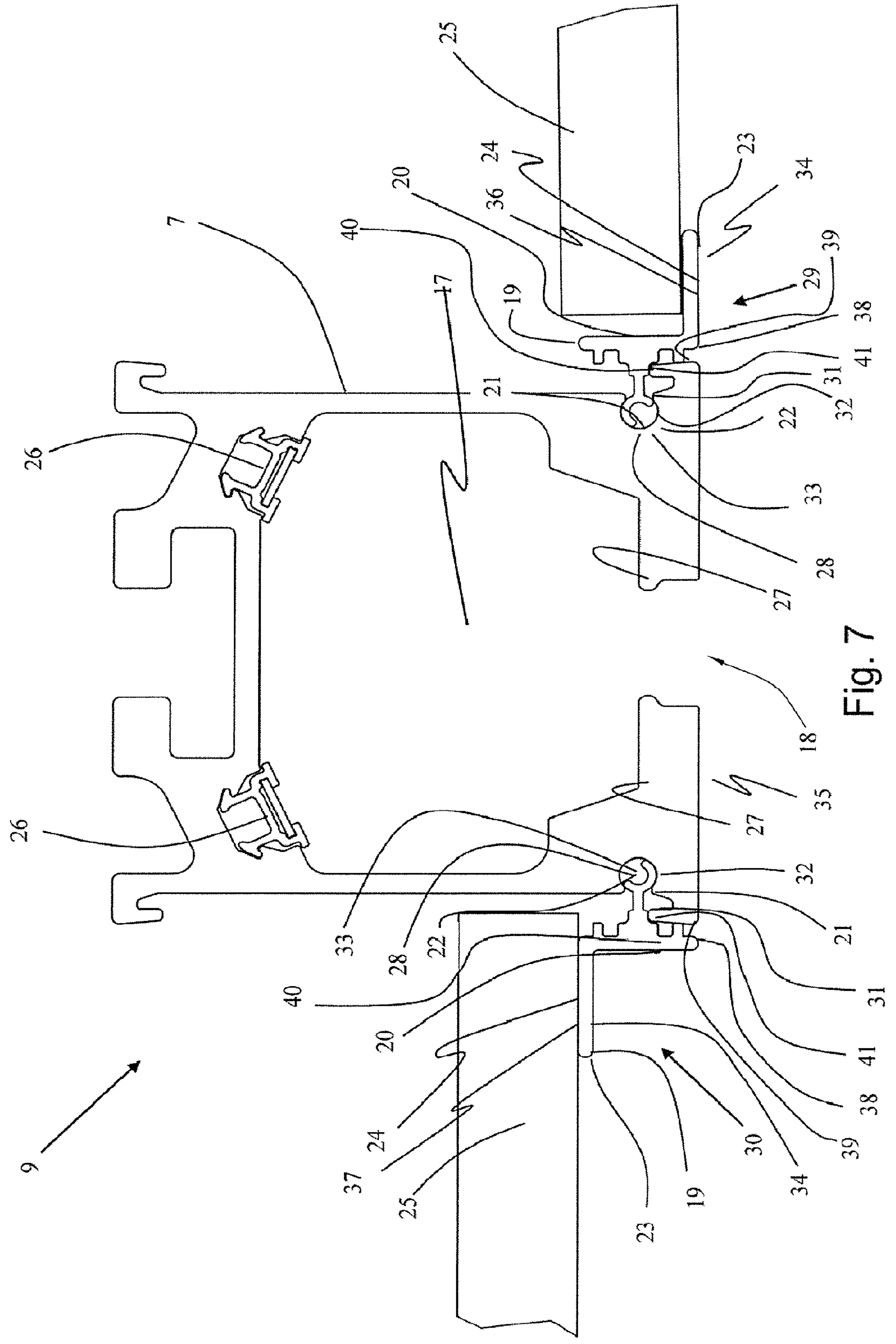
FIG. 7 shows a cross-section of a rail system.

FIG. 7 shows a rail system 9 including a primary rail 7 having a four-edged profile with a hollow cross-section 17 and a slot 18 at the bottom. The primary rail 7 is fastened to and suspended from the ceiling structure of a building (not shown). The hollow cross-section 17 and the slot 18 are adapted to accommodate the trolley 10 of the hoist system (see, FIGS. 1-6). The primary rail has two support surfaces 27 for the wheels of the trolley (see, FIGS. 1-6).

The shown embodiment of the primary rail 7 is provided with electrically conducting rails 26 that communicate with the electric system of the hoist system.

The rail system 9 also includes an angular secondary rail 19 with two legs 20, 23. The functions of the secondary rail are to support an adjacent ceiling board 25 on a support surface 24, and to close the gap between the primary rail 7 and the adjacent ceiling boards 25.

The secondary rail 9 is connected with the primary rail 7 with interacting connecting means 21, 22. In the shown embodiment, the connecting means 22 of the primary rail is a longitudinal undercut groove 28 which is circular 33, and the connecting means 21 of the secondary rail is a longitudinal C-shaped projection 32.

The secondary rail is shown in two mounting positions 29, 30 on FIG. 7. The first mounting position 29 is illustrated at the right side of FIG. 7, and the second mounting position 30 is shown at the left side of FIG. 7. The secondary rail 19 is moved between the two mounting positions 29, 30 as it is e.g., rotated about a transverse axis and inserted into the same longitudinal undercut groove 28 in the primary rail 7. In the first mounting position 29, the bottom side 34 of the secondary rail is largely in the same plane as the bottom side 35 of the primary rail.

Alternatively, the primary rail 7 or the secondary rail 19 may be provided with further grooves (not shown) such that the secondary rail can be moved between the two mounting positions 29, 30 by moving it from one groove to another (not shown).

The secondary rail 19 is provided with a first projection 38 resting on a support surface 39 at the side of the primary rail 7. Furthermore, the primary rail has an upwardly facing support surface 40 on which the first projection of the secondary rail, which has a downwardly facing contact surface 40, is resting. This provides a good distribution of the forces inside the secondary rail 19 as the secondary rail 19 is loaded by compression and tension as far as possible, and only to a limited extent by bending.

Figure 8:
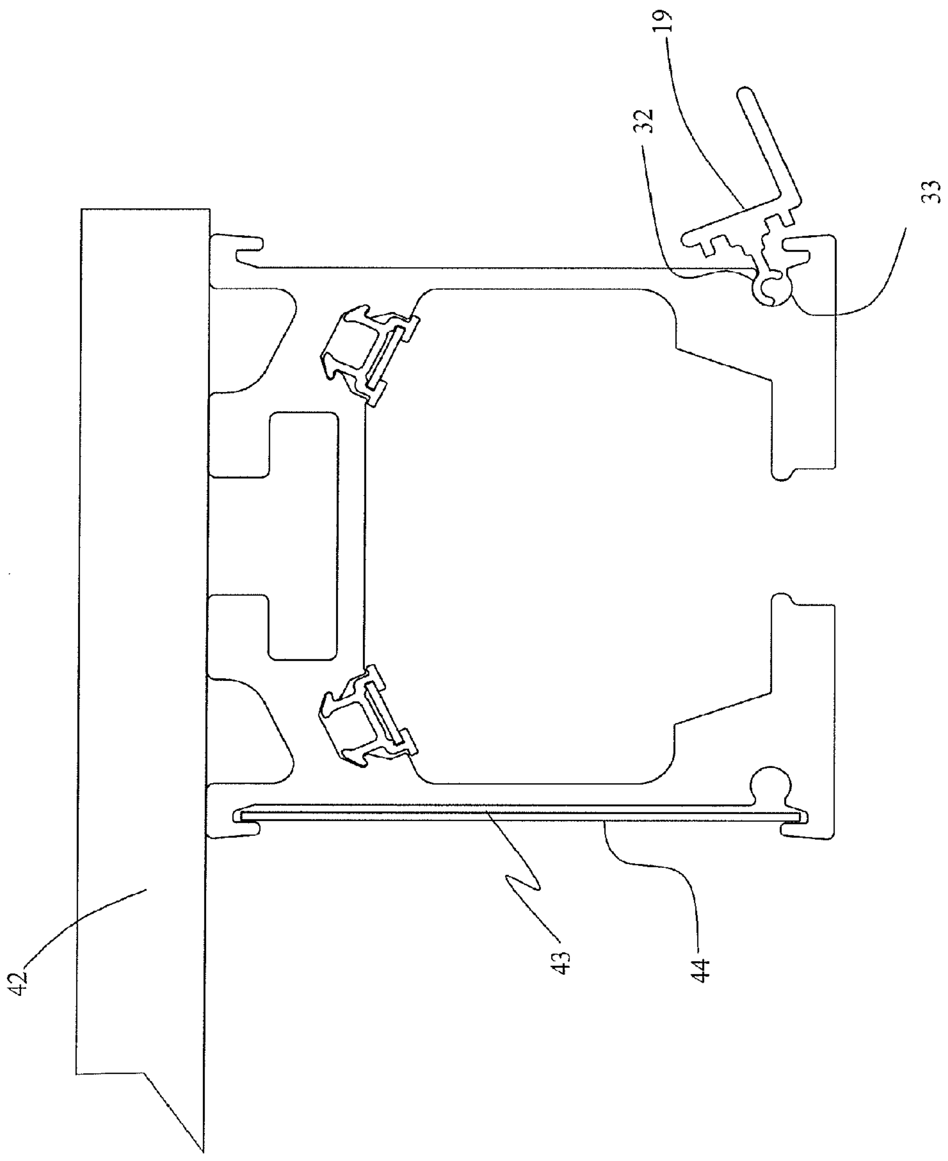
FIG. 8 shows a second cross-section of a rail system.

FIG. 8 shows how the secondary rail 19 is mounted from the side by rotating it about a longitudinal axis, and inserting the C-shaped projection 32 in the circular groove 33 in the primary rail 7.

The rail system 9 is mounted on a ceiling 43 where the left side of the primary rail 7 is free and the right side of the primary rail 7 is covered by ceiling boards (not shown) resting on the secondary rail 19. In the shown embodiment, the primary rail is provided with a longitudinal undercut recess 43 for receiving a decoration board 44 which is used for decorating the primary rail 7. The decoration board 33 may either be plain or provided with a pattern of colours or images.

Figure 9:
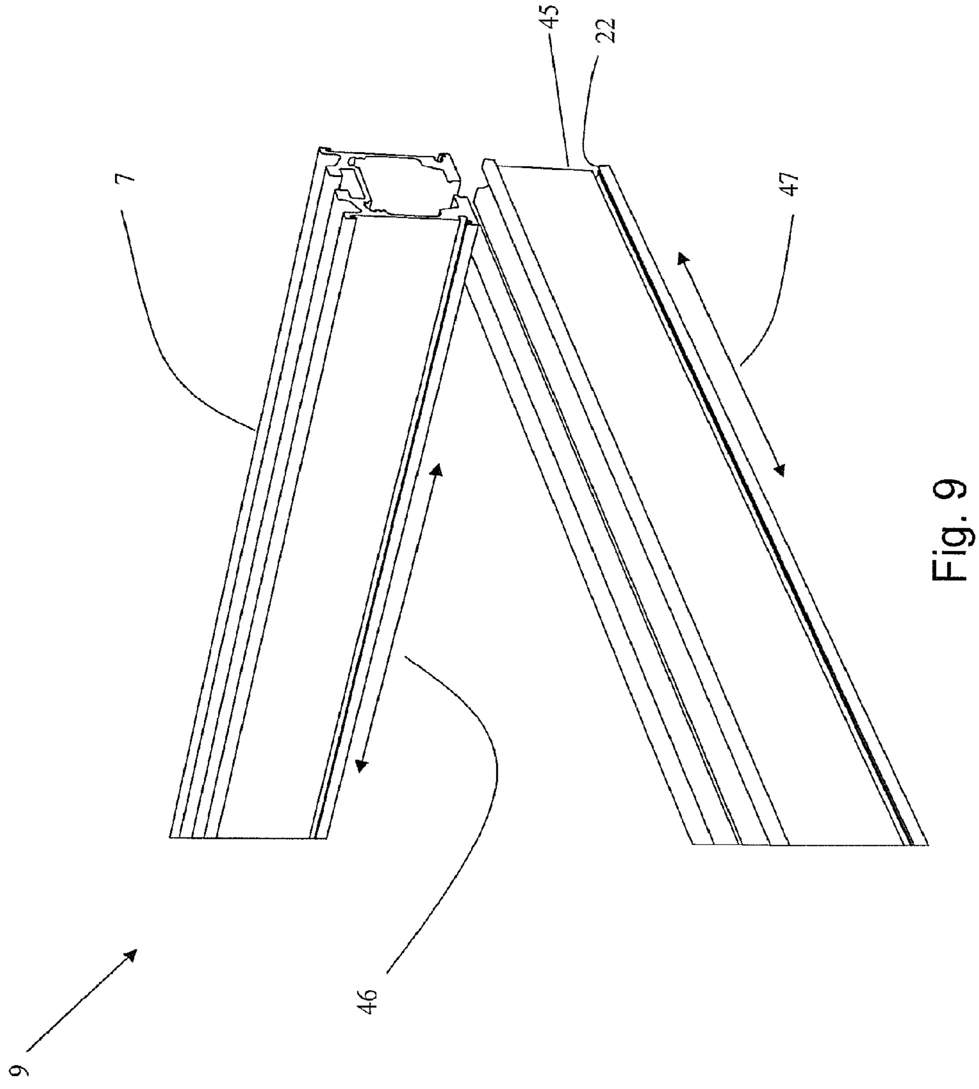
FIG. 9 shows an isometric view of a rail system for a crossbar system.

FIG. 9 shows a rail system 9 for use in connection with a crossbar installation. The rail system 9 includes two parallel primary rails 7 of which only one is shown on FIG. 9. Here under is mounted a crossbar 45 which is disposed perpendicularly to the primary rails 7. The crossbar 45 is mounted with a trolley (not shown) in each primary rail 7 so that it may be moved along the primary rails 7 in direction of the arrows 46.

The hoist system 1 (see, FIGS. 1-6) is suspended in the crossbar 45 and may move in a direction 47 perpendicular to the direction of movement 46 of the crossbar. The hoist system 1 (see, FIGS. 1-6) may hereby cover the entire area under the rail system 9 and is not limited to movement along a single primary rail 7.

The primary rails 7 and the crossbar 45 will typically have uniform cross-sections. The crossbar may advantageously be provided with decoration boards (not shown) on both sides in order to hide the connecting means 22.

Figure 10:
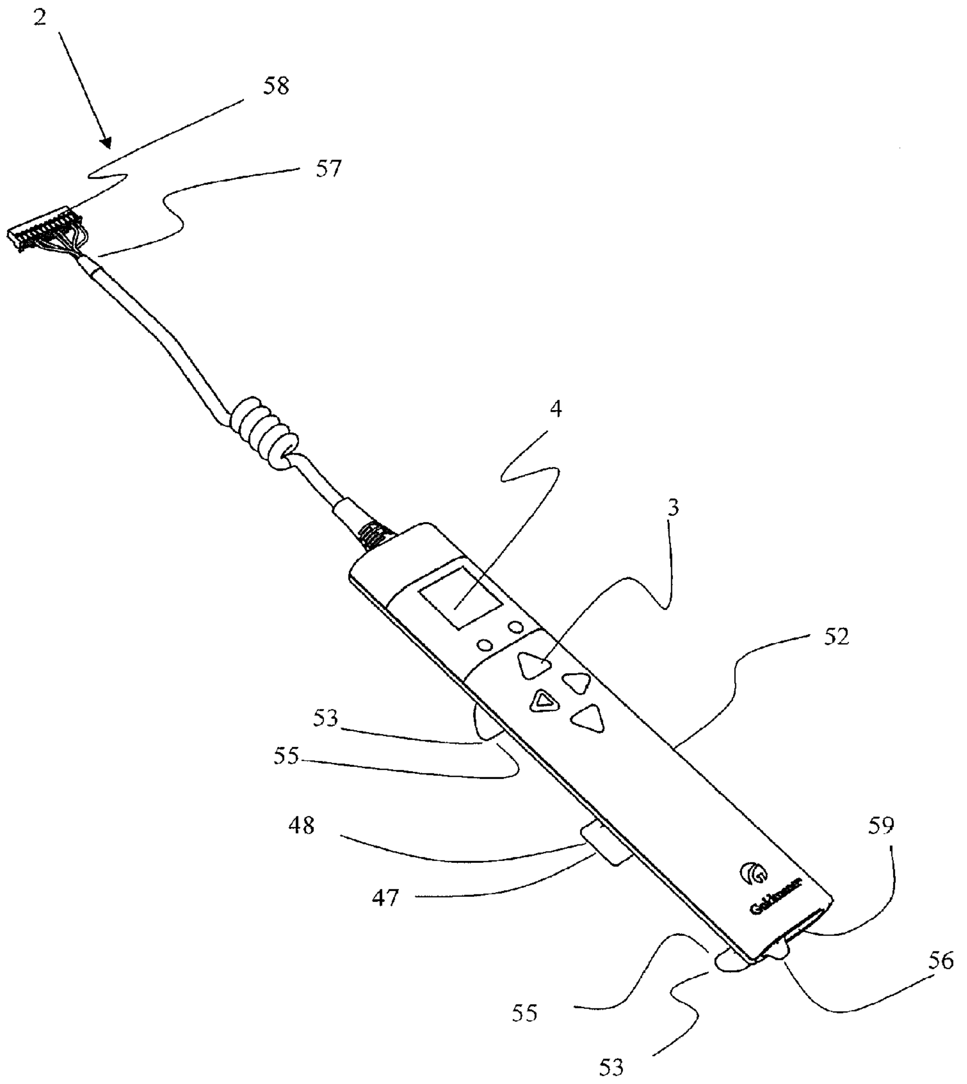
FIG. 10 shows an isometric view from the front of a manual control.
Figure 11:
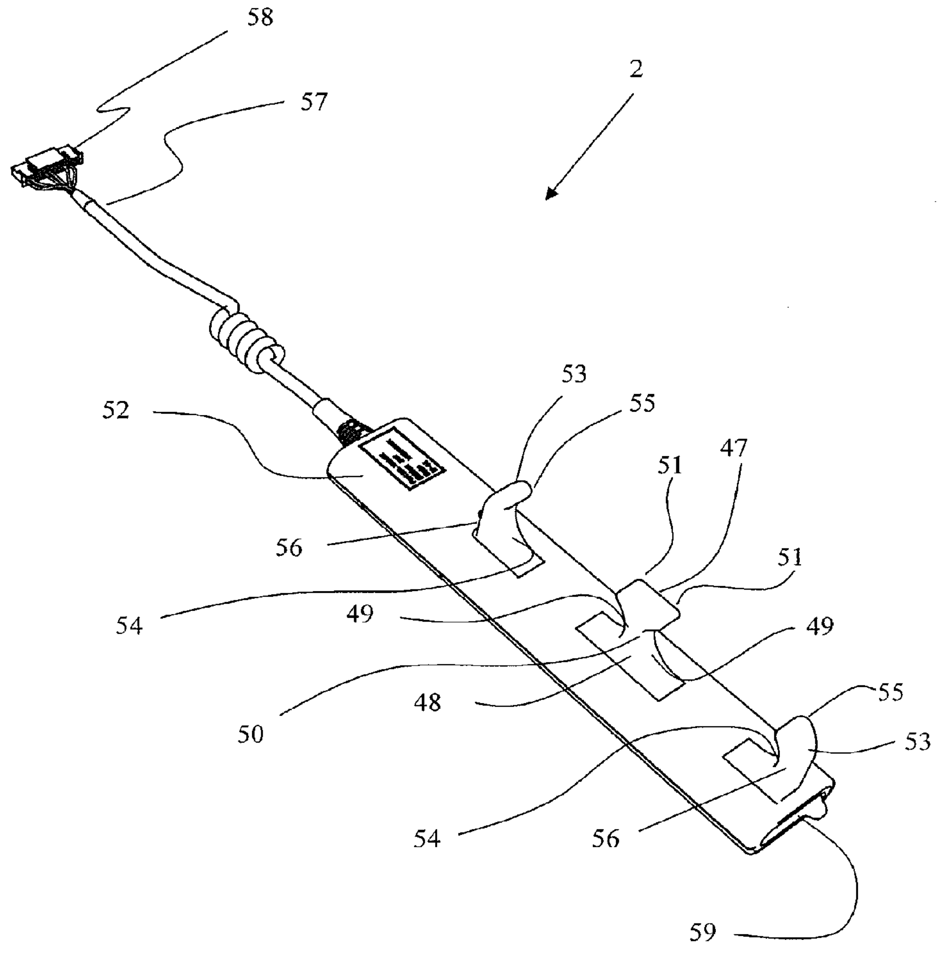
FIG. 11 shows an isometric view from the back of a manual control.
Figure 12:
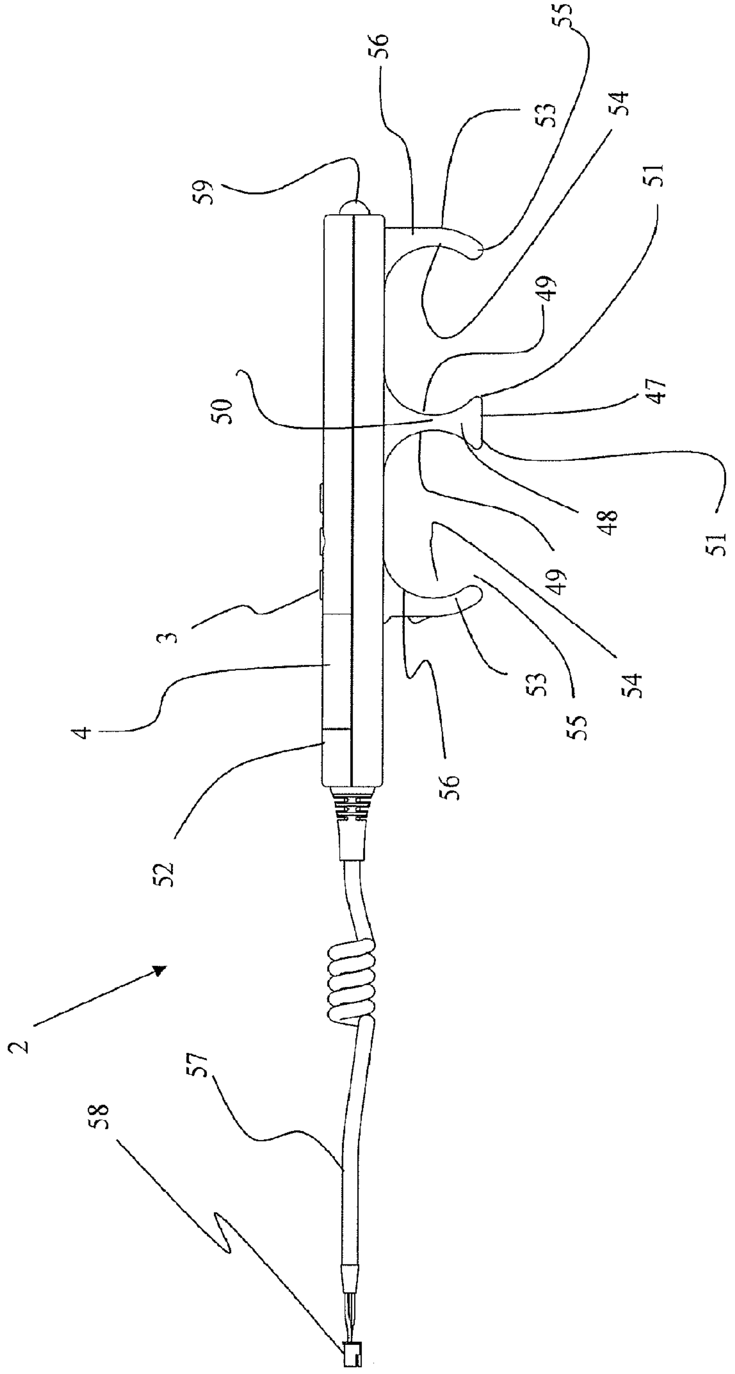
FIG. 12 shows a side view of a manual control.

FIGS. 10-12 show a manual control 2 for a hoist system 1. The manual control 2 includes a housing 52 with an internal electronic control unit (not shown), a wire connection 57 with a plug 58 such that the control unit of the manual control may communicate electrically with a control unit in the hoist system 1 (see, FIGS. 1-6) based on the user pressing the control buttons 3. The illustrated embodiment also includes a display 4 which may present the user for various information, such as weight of the person lifted. The manual control 2 can be provided with a space (not shown) for a data socket and/or a charge plug behind a cover 59. These plugs/sockets may, e.g., be used for charging a battery-powered hoist system, for diagnosing the electric system in case of failure, or for programming the software of the control unit. Alternatively, the space can be used for batteries for the manual control 2 if this is wirelessly connected with the hoist system 1.

The manual control 2 is provided with a grip 47 which is intended for disposition between the user's long finger and ring finger when the user grips around the manual control 2 with a primate grip. The grip 47 is formed by a part 48 projecting from the housing of the manual control, having a largely T-shaped cross-section with gripping faces 49 which extend transversely to the stem 50 of the T. The branches 51 of the T function as hooks when the user opens the hand and prevents the handle 2 from leaving the hand of the user as long as long finger and ring finger are held together. This is practical in connection with commencing a lift where the lifting apron and the person are to be adjusted several times until the person hangs freely and the lifting apron therefore is tight.

In order further to ensure that the manual control 2 will not leave the user's hand, the grip includes two additional projections 53. These are L-shaped with a support face 54 facing the projecting part 48 of the grip. The distance between the projecting part 48 and the further projecting parts 53 is adapted to the average width of the two fingers. The branches of the L's act as hooks when the user opens his hand, further assisting in preventing the manual control 2 from leaving the hand.

The grip 47 is rounded such that the transition between the housing 52 and the stem 50 of the T, the stem 50 of the T and the branches 51 of the T, the housing 52 and the stem 56 of the L, and the stem 56 of the L and the branch 55 of the L are rounded. This makes it comfortable to use the grip 47. The rounding is adapted to the average radius of a finger.

The combination of the projecting parts 48, 53 means that four of the user's fingers are connected with the grip 47.

The grip 47 and the housing 52 are made by a 2K molding. By this technique, it is possible to make a component of two different materials in the same moulding such that they appear without joints. This provides a very good connection between the grip 47 and the housing 52.

The manual control is designed with a symmetric cross-section about a plane through the housing 52 and the grip 47 such as to be adapted for operation with either left or right hand.

The cross-section of the lifting bracket 13 is adapted such that it corresponds to the two openings between the three parts of the grip. The lifting bracket 13 may thus be used as parking space for the manual control 2 when this is not in use. This is illustrated on FIGS. 1-6.

Figure 13:
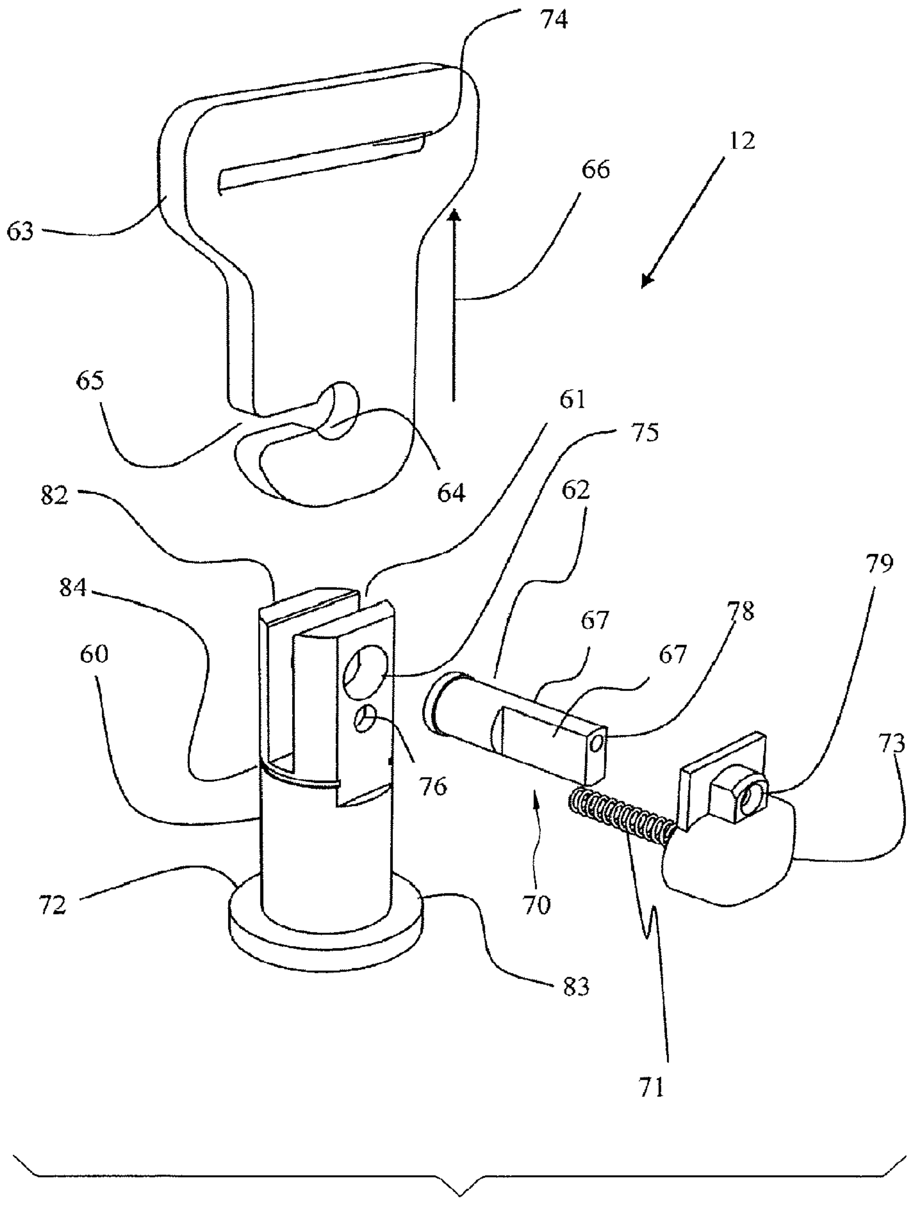
FIG. 13 shows an exploded view of a coupling.

FIG. 13 shows an exploded view of a coupling 12 which includes a hook 63, a housing 60, a shaft 62, a spring 71 and a pushbutton 73.

The hook 63 has an opening 74 at the end through which the lifting strap 11 of the hoist system (see, FIGS. 1-6) becomes connected to the hook 63. The other end of the hook is provided a receiving opening 64 which is circular. The receiving opening 64 is adapted for accommodating the shaft 62. The receiving opening 64 communicates with an insertion opening 65. The insertion opening 65 is adapted to receive a part 70 of the shaft 62 which is provided with opposing flats 67.

The housing 60 which has a largely cylindric shape is provided with a cutout 61 at its first end 82, the width of which largely corresponding to the width of the hook such that the hook 63 can be inserted in the cutout 61. The housing 60 has two aligned cylindric openings 75 transversely of the cutout 61, and which are arranged as guides for the shaft 62. The housing is provided with another cutout 76 that form a seat for a spring 71.

Figure 15:
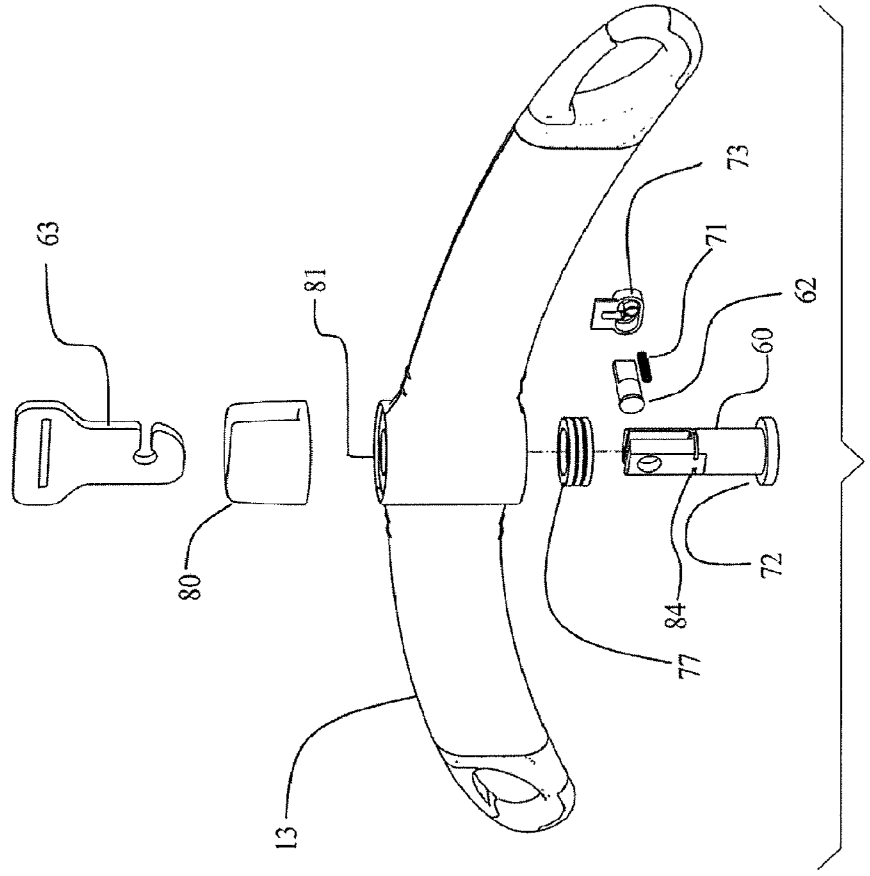
FIG. 15 shows an exploded view of the coupling and the lifting bracket.

At the other end 83 of the housing, the housing is provided with a contact surface 72 for a thrust bearing 77 (see, FIG. 15). This contact surface 72 is established in that the cylindric housing 60 has a part with a diameter increase under the contact surface 72.

The shaft 62 has a cylindric cross-section. On a section 70 of its length, the shaft is provided with opposing flats 67. In the shown embodiment, the shaft is provided with an opening 78 transversely to the flats 67 for mounting a split-pin (not shown) for retaining a pushbutton 73.

Alternatively, the spring 71 can be disposed with the shaft 62 at the centre such that the spring 71 is wound around the shaft 72. The spring 71 is abutting on the housing 60 at one end and abutting against a split-pin (not shown) on the shaft, an abutment surface (not shown) provided by a diameter increase of the shaft 62 or another kind of abutment or fastening to the shaft 62 at its other end.

The pushbutton 73 is connected with a spring 71. The spring 71 abuts on another cutout 76 in the housing 60 when the coupling 12 is assembled. The pushbutton 73 is fastened to the shaft 62 by a split-pin (not shown) through an opening in the shaft 78 and an opening 79 in the pushbutton 73.

Figure 16C:
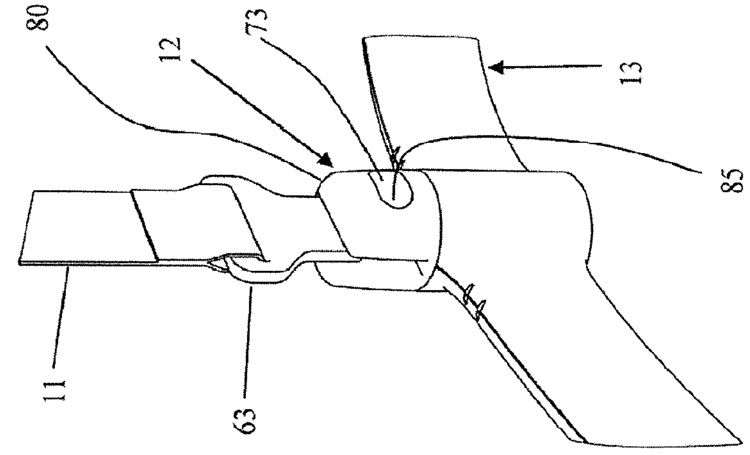
FIG. 16 shows an illustration of how the hook is put on the coupling.
Figure 16B:
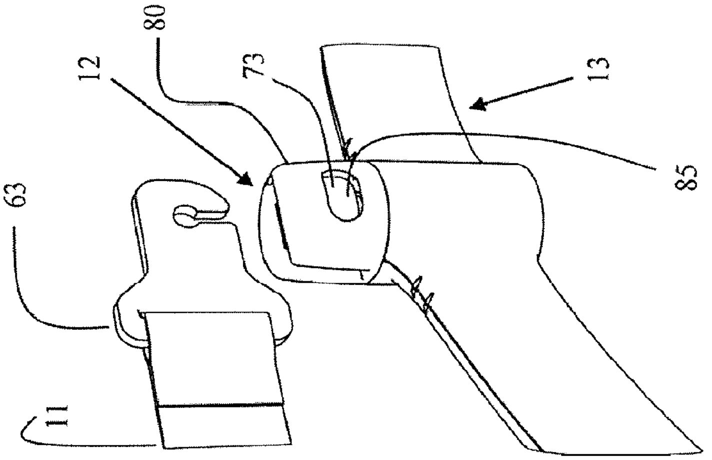
Figure 16A:
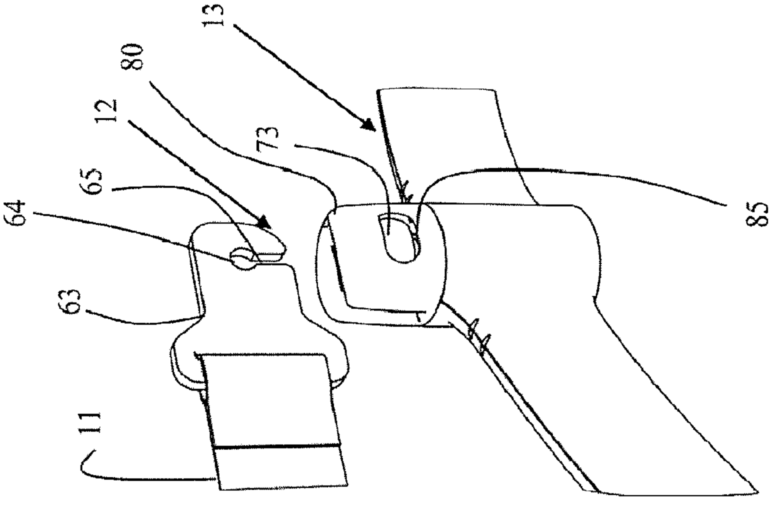

On FIGS. 15-16, the coupling 12 is provided with a cover 80 around the housing 62. This cover 80 ensures that the pushbutton 73 does not leave the housing 60 and that the spring 71 is prestressed. The pushbutton 73 is operated through an opening 85 in the cover. The cover 80 is fastened on the housing 60 by means of a recess 84 (see, FIG. 13) on the housing and a complementary projection (not shown) in the cover 80.

Figure 14A:
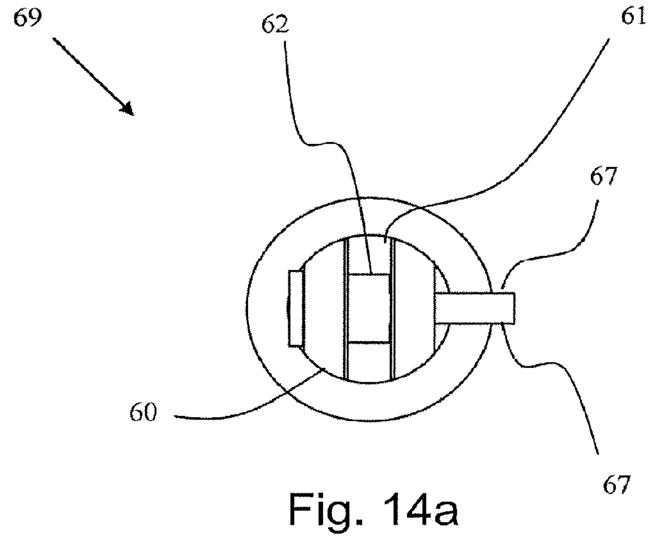
FIG. 14 shows a top view of the coupling with the shaft in two positions.
Figure 14B:
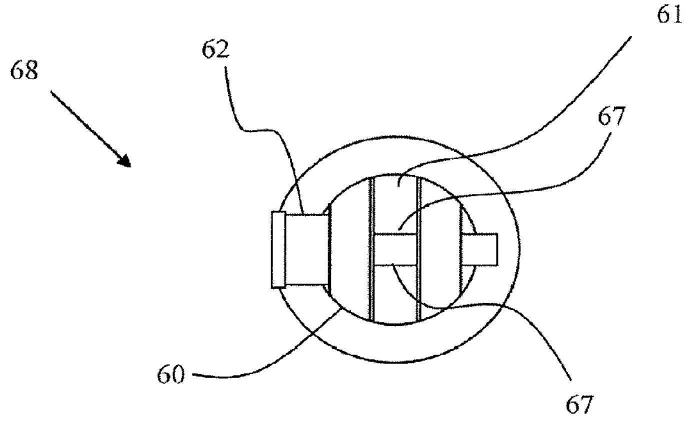

FIG. 14 shows the two positions 68, 69 of the shaft.

When the pushbutton 73 (see, FIG. 13) is in its rest position, the shaft 62 is in its first position 69 (see, FIG. 14*a*) where the flats 67 are displaced outside the cutout 61, and the circular cross-section of the shaft is located in the cutout. In this position, the hook 63 cannot be released from the coupling 12 if the hook is engaged.

When the pushbutton 73 (see, FIG. 13) is pressed down, the shaft 62 is in its first position 68 (see, FIG. 14*b*) where the flats 67 are located in the cutout 61, and the circular cross-section of the shaft is displaced outside the cutout 61. In this position, the insertion opening 65 (see, FIG. 13) of the hook can pass the flats 67 when the hook 63 is oriented in a direction so that the angle of the insertion opening is parallel with the flats 67 such that the hook 63 can be applied or released.

FIG. 15 shows how the coupling 12 is integrated in a lifting bracket 13. At first, the thrust bearing 77 is mounted on the contact surface 72 on the housing 60. Then the housing 60 with thrust bearing 44 is passed through an opening 81 in the lifting bracket 13. The lifting bracket 13 thereby abuts on the thrust bearing 77. The shaft 62, the pushbutton 73 and the spring 71 are mounted as described in FIG. 13. The cover 80 is fastened on the housing 60 by means of a recess 84 (see, FIG. 13) on the housing and a complementary projection (not shown) in the cover 80. Displacing the shaft 62 is performed through an opening 85 in the cover 80. The lifting bracket 13 may hereby be connected to the hoist system 1 (see, FIGS. 1-6) by means of the hook 63. Due to the thrust bearing, the lifting bracket 13 may be turned freely 360° round in a horizontal plane.

Figure 17:
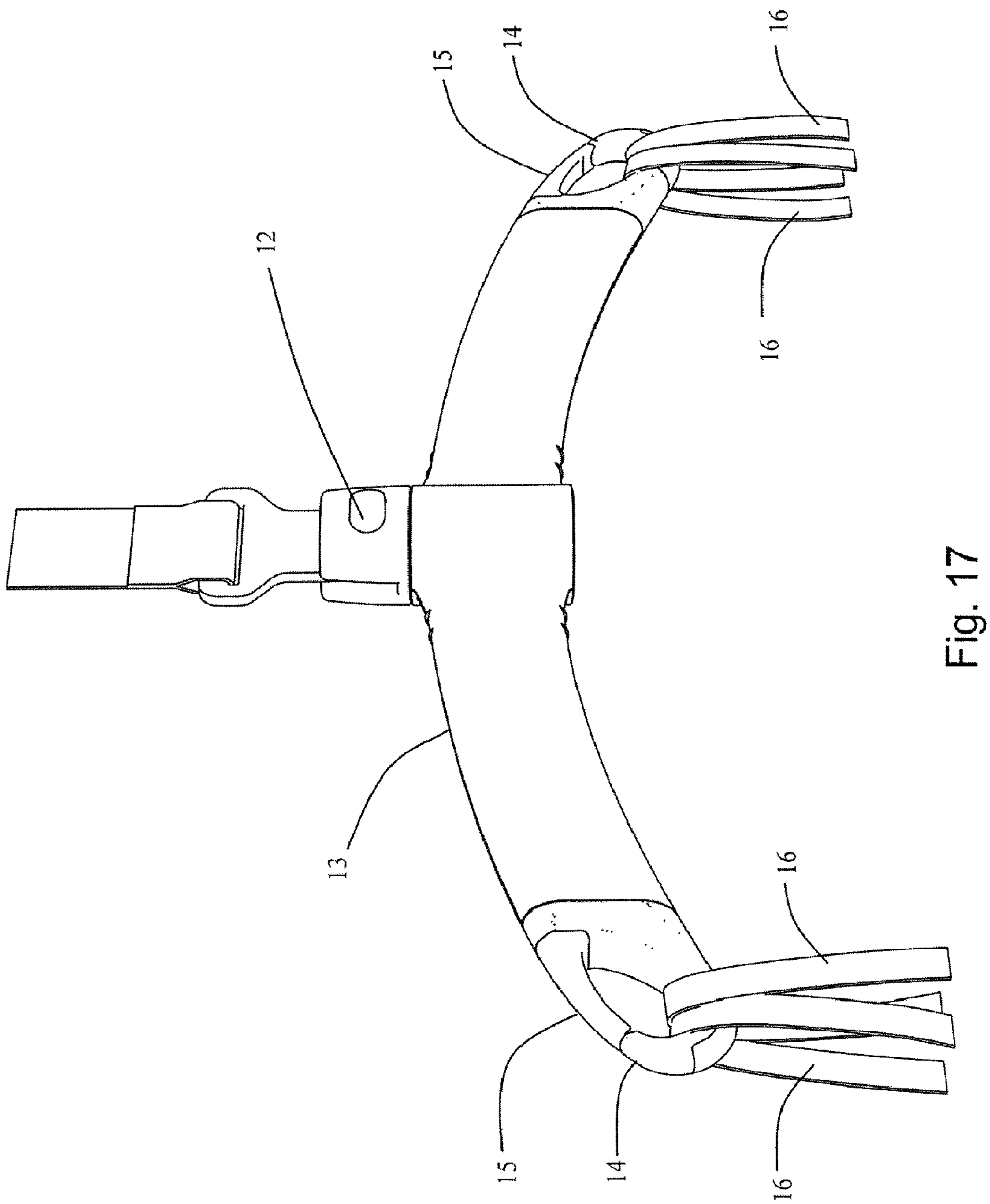
FIG. 17 shows an isometric view of the lifting bracket with straps for a lifting apron mounted thereon.

FIGS. 16-17 shown how the coupling 12 is used with a lifting bracket 13 in connection with the hoist system 1 (see, FIGS. 1-6). When the lifting bracket 13 is to be connected with the hoist system 1 (see, FIGS. 1-6), the following steps are to be performed:

FIG. 16*a*

1. The strap 11 and the hook 63 are oriented such that the angle of the insertion opening 65 is parallel with the flats 67 (see, FIG. 13).

2. The pushbutton 73 is pressed in such that the flats 67 (see, FIG. 13) are located in the cutout 61 (see, FIG. 14*b*).

FIG. 16*b*

The hook 63 is passed down through the cutout (see, FIG. 13) such that the flats 67 (see, FIG. 13) pass through the insertion opening 65 until they are located in the receiving opening 64.

FIG. 16*c*

The hook 63 is turned to a vertical position and the pushbutton 73 is released. The hook 63 and the lifting bracket 13 are now coupled together.

When the lifting bracket 13 is to be dismounted, steps 1-4 are performed in reversed order.

The lifting bracket 13 and the hook 63 cannot be released without intent as it is necessary to press the pushbutton 73 in order to release the hook 63. Besides, the lifting bracket 13 cannot be released deliberately when the hook 63 is loaded since it is required to turn the hook 63 to a position where it is perpendicular to the pull direction 66 (see, FIG. 13). This is not possible for the user when a person is suspended in the lifting bracket 13.

FIG. 17 shows the lifting bracket 13 with coupling 12 and the straps 16 of a lifting apron (not shown) suspended in the hooks 14 of the lifting bracket. The straps 16 are ensured against disengagement by means of the lock 15 of the hooks which covers the opening of the hooks.

The hook lock 15 is, e.g., made of Ethylene Propylene Diene Monomer (EPDM) or other suitable thermoplastic elastomer (TPE).

What is claimed is:

1. A coupling comprising:

a hook, the hook comprising opposed upper and lower portions, with a pull axis extending generally between the upper and lower portions, the upper portion comprising a slot for receiving a lifting strap, and the lower portion comprising a circular cutout and an insertion opening extending from a periphery of the cutout to an outer edge of the hook, wherein the insertion opening extends at an angle relative to the pull axis;

an elongate housing, the housing comprising opposing upper and lower ends, with a housing axis extending generally between the upper and lower ends, the lower end configured to connect to a lifting bracket, and the upper end of the housing comprising a lateral notch, the housing further comprising a circular opening extending through the upper end thereof extending substantially perpendicular to and intersecting the notch, wherein a width of the notch is greater than a thickness of the hook, such that the lower portion of the hook is insertable into the notch so that the circular cutout of the hook is aligned with the circular opening of the housing; and an elongate shaft, wherein the shaft is resiliently mounted to the housing via a biasing member so as to be slidable within the circular opening of the housing, the shaft comprising a cylindrical portion and a flattened portion opposite the cylindrical portion, the cylindrical portion defining a diameter substantially corresponding to a diameter of the circular opening, and the flattened portion defined by opposing flats extending substantially parallel to the housing axis;

wherein the coupling is movable between:

a locked position, wherein the lower portion of the hook is inserted into the notch, the cylindrical portion of the shaft is biased by the biasing member into the notch and through the circular cutout of the hook, and the hook is rotated so that the insertion opening is non-parallel to the housing axis, thereby locking the hook to the housing about the shaft, and whereby moving the hook along the pull axis moves the housing in substantially the same direction; and an unlocked position, wherein the lower portion of the hook is inserted into the notch, the flattened portion of the shaft is pressed against the biasing member into the notch and through the circular cutout of the hook, and the hook is rotated so that the insertion opening is aligned parallel to the opposed flats of the flattened portion of the shaft, whereby moving the hook away from the housing along the housing axis releases the hook from the housing.

2. The coupling according to claim 1, characterised in that the shaft is resiliently connected to the housing by a spring connected with the shaft and the housing.

3. The coupling according to claim 1, characterised in that the spring is a spring from the group consisting compression springs, extension springs, twist springs and torsional springs.

4. The coupling according to claim 1, characterised in that the angle of the insertion opening in relation to the pull axis is 90°.

5. The coupling according to claim 1, characterised in that the housing further includes a contact surface facing perpendicularly to the pull axis for a thrust bearing at the other end of the housing.

6. The coupling according to claim 1, characterised in that the housing further includes a cover with an opening which is aligned with one of the openings of the housing, and that the shaft is received in the cover, both in its locked and its unlocked positions, respectively.

7. The coupling according to claim 1, characterised in that a shaft end is provided with a pushbutton.

8. A hoist system comprising:

a coupling according to claim 1;

a lifting strap connected to the slot of the hook;

a lifting bracket connected to the lower end of the housing; and lifting apron straps detachably connected to the lifting bracket.

* * * * *